Aug. 15, 1950   C. R. HAGEN ET AL   2,518,465
COTTON PICKING APPARATUS
Filed June 29, 1944   5 Sheets-Sheet 1

Inventors:
Clarence R. Hagen
and Louis E. Nickla.
By Paul O. Pippel
Atty.

Aug. 15, 1950 C. R. HAGEN ET AL 2,518,465
COTTON PICKING APPARATUS
Filed June 29, 1944 5 Sheets-Sheet 5

Inventors:
Clarence R. Hagen
and Louis E. Nickla.
By Paul O. Pippel
Atty.

Patented Aug. 15, 1950

2,518,465

UNITED STATES PATENT OFFICE 2,518,465

COTTON-PICKING APPARATUS

Clarence R. Hagen, Chicago, and Louis E. Nickla, Cicero, Ill., assignors to International Harvester Company, a corporation of New Jersey Application June 29, 1944, Serial No. 542,770

5 Claims. (Cl. 56—12)

This invention relates to cotton-picking apparatus and has to do more particularly with a novel arrangement of such apparatus providing for installation of its component parts in certain advantageous positions upon a tractor.

The invention is primarily useful in the assembly of a picker unit of the spindle type and of a receptacle for the picked cotton upon a relatively small tractor. Picker units employing banks of rotating spindles embody a concentration of considerable mass making it highly desirable for the apparatus to distribute its weight upon those parts of the tractor most capable of withstanding the weight. One object of the invention is to provide an apparatus which satisfactorily meets the weight distribution problem by placing the picker unit forwardly of one of the rear axle housings adjacently to the tractor engine and by placing the receptacle for picked cotton upon the tractor rearwardly of the other rear axle housing. This causes most of the weight to be imposed upon the rugged traction wheels, meanwhile minimizing additional weight on the ground-engaging steering wheels so steering ease is preserved.

The problem of weight distribution is complicated by the desirability of disposing the necessarily bulky cotton receptacle where it will avoid interference with vision of the operator. Another object of the invention is the provision of a suitable mounting for the receptacle principally rearwardly of the operator's station and to one side thereof in such a fashion that the operator can readily see to steer the vehicle in a forward direction by using the standard tractor controls and still obtain good weight distribution of the apparatus.

Another object is the provision of a novel arrangement for conveying cotton from the picker unit over the axle housing rearwardly thereof and thence transversely of the tractor to the receptacle to avoid interference with plant row vision of the operator and to avoid striking the cotton plants with the conveyor.

Another object is the provision of an arrangement as the above with the picking unit at a side of the tractor engine and a driving mechanism therefor extending from a rear power-take-off shaft and forwardly over the axle housing to said unit.

A further object is the provision of a novel mounting of cotton-picking apparatus upon a tractor, wherein the picker unit is disposed alongside of the engine forwardly of an operator's station adjacently to a rear axle housing at the same side of the engine to improve the operator's vision of the plant row being harvested.

A further object is the provision in a cotton-picking apparatus including a cotton receptacle on a rear portion of the tractor and a picking unit on a part of the tractor spaced therefrom, of a novel pneumatic system for conveying the cotton from the picking unit to the receptacle including a blower below the receptacle for propelling the cotton entering the same from the picking unit and changing the flow of the cotton to an upwardly direction to the receptacle.

The above and other desirable objects inherent in and encompassed by the invention will be better understood upon reading the ensuing description with reference to the annexed drawings, wherein:

Fig. 2ª is a vertical sectional view taken through the plant passage of the picking unit as indicated by the line 2ª in Fig. 2.

General statement

Since the present invention has to do with the general arrangement of the various components of the apparatus, all of those components are herein shown and described to illustrate their assembly with an ordinary farm tractor. The tractor and the crop harvesting apparatus thereon constitute a self-propelled crop harvesting machine.

The tractor

The tractor upon which the apparatus is herein assembled is a narrow bodied tricycle type farm tractor comprising a body 10 projecting forwardly from oppositely extending rear axle housings 11 and 12. At the front portion of the body 10 is the conventionally placed internal combustion engine 13 superposed by a fuel tank 14 and a hood 15. A shaft 16 at the front of the tractor is an extension of the engine crank shaft. Support for the front end of the tractor is provided by the usual steering truck 17 comprising a ground-engaging steering wheel 18. Support for the rear end of the tractor is provided by rear traction wheels 19 and 21 at the outer ends of the axle housings 11 and 12. Depending gear containing portions 22 and 23 at the outer ends of the axle housings 11 and 12 contain gears (not shown) which transmit driving force from axles within the housings 11 and 12 to the wheels 19 and 21, the housing portions 22 and 23 being upright so as to support the axle housings at an elevation to give ample clearance for the field plants.

An operator's station includes an operator's seat 24 suitably supported adjacently to and over the axle housing 12—that is, to one side of the tractor body 10. The tractor steering wheel 25 is directly in front of the seat 24.

Cotton-picking unit and support therefor

A cotton-picking or crop gathering unit generally designated 26 is of the revolvable spindle type. This unit, which is placed at the right of the tractor body as viewed from the rear, includes a casing 27 separated from a pressure plate assembly 28 by a fore and aft extending plant receiving passage 29. This passage or crop receiving section faces forwardly of the tractor. Two groups, A and B, or assemblies of cotton-picking spindles are enclosed in the casing 27 in a tandem arrangement with the assembly A disposed forwardly of the assembly B. Cotton-picking assemblies A and B may be of the character fully described in United States Patent 2,140,631, so it will suffice for the present disclosure merely to explain that the picker spindles SP of the assemblies A and B are revolved generally about vertical axes A' and B' (appearing as points in Figure 2) to cause their tips to follow the path indicated by the dot-dash lines $a$ and $b$. It will be seen, therefore, that the picker spindles, while they are being revolved about the axes A' and B', are successively projected into the plant receiving passage 29 and thereafter withdrawn from this passage. While in the passage and while rotating about their individual axes, these spindles engage and cause the cotton of ripened bolls to be wound thereabout so that upon retraction of the spindles into the casing 27, this cotton will be withdrawn from the bolls. There are several vertically spaced rows of the spindles SP so that the cotton plants disposed within the passage will be operated upon throughout the height of the passage.

The spindles SP revolve in the direction indicated by the arrows AW, and upon arriving in registry with a group of vertically spaced doffing disks shown in dotted outline at D, the cotton is removed from the spindles by these disks and discharged into the casing 27. Subsequently, the spindles come in registry with vertically spaced moistening disks M where they are moistened prior to again being projected into the plant receiving passage. The casing 27, in addition to housing the picking spindle sets, the doffer disks and the moistening disks, also serves as an air receiving or suction chamber of a pneumatic system for the conduction of the picked cotton away from the picker finger assemblies into a crop-receiving receptacle 31. Air is drawn into the casing 27 through the openings at the plant passage where the picking fingers extend outwardly into said passage, and this air laden with the cotton doffed from the spindles, leads upwardly through conduit legs 32 and 33 for ultimate delivery into the receptacle 31. Doors 34 and 35 upon the outer side of the casing 27 pivot at their forward ends on supports (not shown) about axes which are coaxial with the lower ends of the conduit legs 32 and 33, and these doors have short conduit necks 36 and 37 pivotable within the conduit legs to facilitate opening and closing of the doors. Access is thereby easily had to the picker spindles, the doffing apparatus and the spindle moistening apparatus from the outer side of the picking unit 26.

That side of the plant receiving passage 29 opposite to the casing 27 is formed by plant pressing plates 38, 39, and 40 which are yieldably held into the positions illustrated so that they may be displaced toward the tractor engine when pressed upon by a profuse plant growth occupying the passage 29. The pressure plate assembly 28 is supported from the chamber 27 by a horizontal rod 41 at the upper forward end of the passage 29 and by a passage covering plate 42 at the rear end of the passage in registry with the rear picker spindle assembly B.

Figures 1, 2:
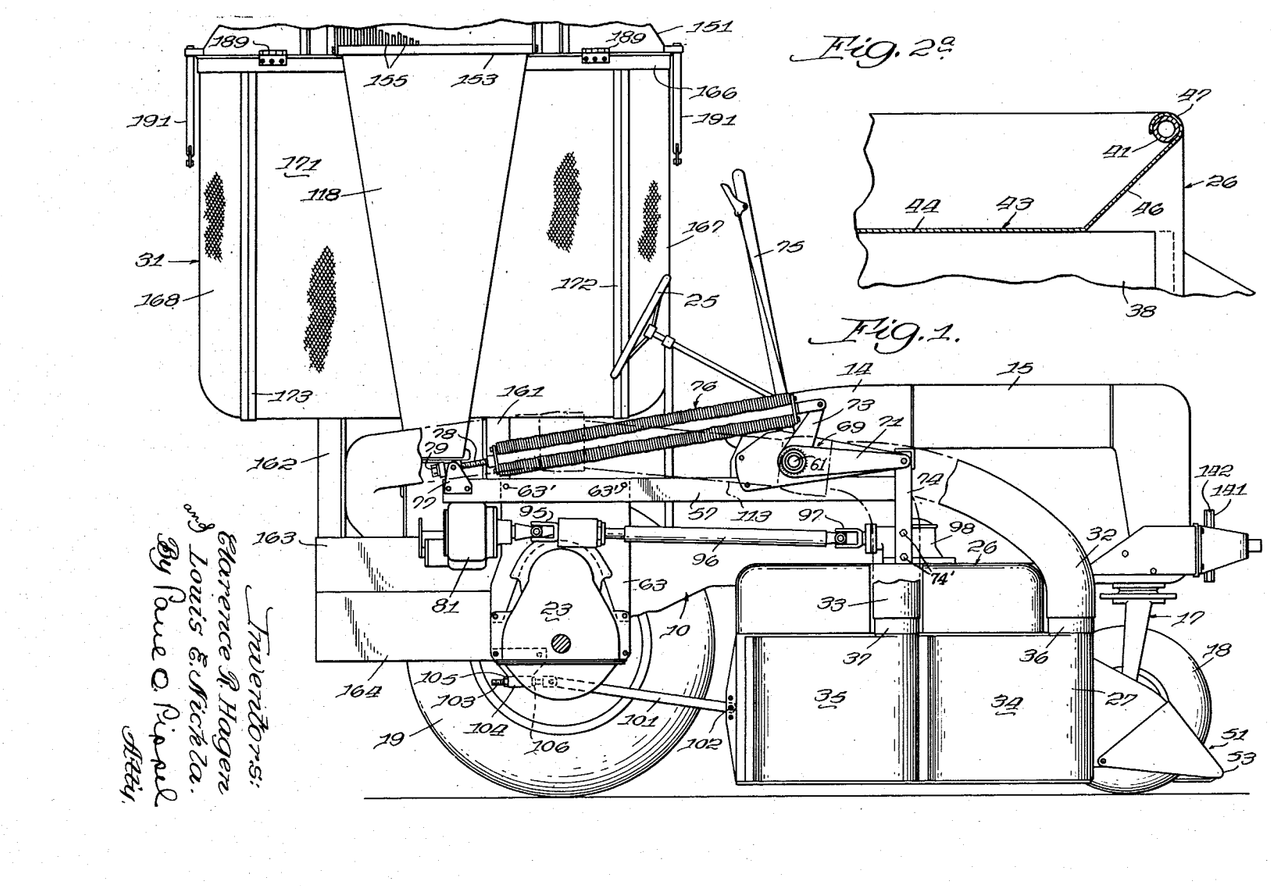
Fig. 1 is a side elevational view of a tractor with the preferred embodiment of the invention installed thereon, the nearest traction wheel of the tractor being omitted and a top portion of a cotton receptacle of the cotton picking apparatus being broken away.
Fig. 2 is a plan view of the tractor and apparatus shown in Fig. 1, the tractor steering wheel being omitted and a portion of the tractor fuel tank being broken away.

In Figs. 2 and 2a, the front portion of the plant receiving passage 29 can be seen to be covered by a detachable covering plate 43 having a horizontal portion 44 secured at its rear end to the plate 42 by a cap screw 45, an upwardly inclined plant deflecting portion 46, and a rolled portion 47 at its forward end disposed about the rod 41 to which it is secured by a cap screw 48.

It is a characteristic of the cotton plant for the bolls adjacent to the ground to ripen first and for the bolls at the top of the plant to ripen or mature last. Since the bolls mature successively throughout a picking season of considerable duration, it is the practice with cotton-picking machinery, as it has always been in hand picking, to pick the field several times during the picking season. When picking the crop for the first time, the bolls at the top of the plant will usually be sufficiently immature that it is unnecessary to cause the tops of the plants to be operated upon by both the front and back picker finger assemblies, and with this in view, the deflector plate 43 in vertical registry with the front assembly A, has been made easily detachable so that during this initial picking the tops of the plant may be allowed to project above the spindles of the front picking assembly. This avoids all likelihood of any injury to the unripened bolls by the front picking fingers. Such cotton that is ready for picking can be readily gathered by the rear finger assembly B.

A further advantage is gained by operating the machine with the passage cover plate 43 removed. This further advantage is gained partly by the fore and aft alinement of the operator's station 24 with the plant passage 29 so that an operator at the station 24 can see through the uncovered portion of the passage adapted to be closed by the plate 43 and thereby observe the stalks of the plants in the forward end of the passage as well as those about to enter the passage. This improved vision for the operator makes it much easier for him to properly steer the apparatus with respect to the plant row. The throat to the passage 29 is quite narrow, making accurate steering essential.

Later in the season when the plants have an abundance of mature bolls at their tops, the plate 43 can be reassembled with the picking unit so that the upper parts of the plants will be deflected thereby downwardly for operation upon by the front group of picking fingers as well as the rear group thereof.

A plant lifting device 51 is attached to the forward end of the unit 26 for raising the lowermost stems of the plants off of the ground to a sufficient height for passing through the lower ones of the picking spindles SP. The device 51 comprises backwardly inclined rods 52 having ground-engaging runners 53 attached to their front ends.

Figure 4:
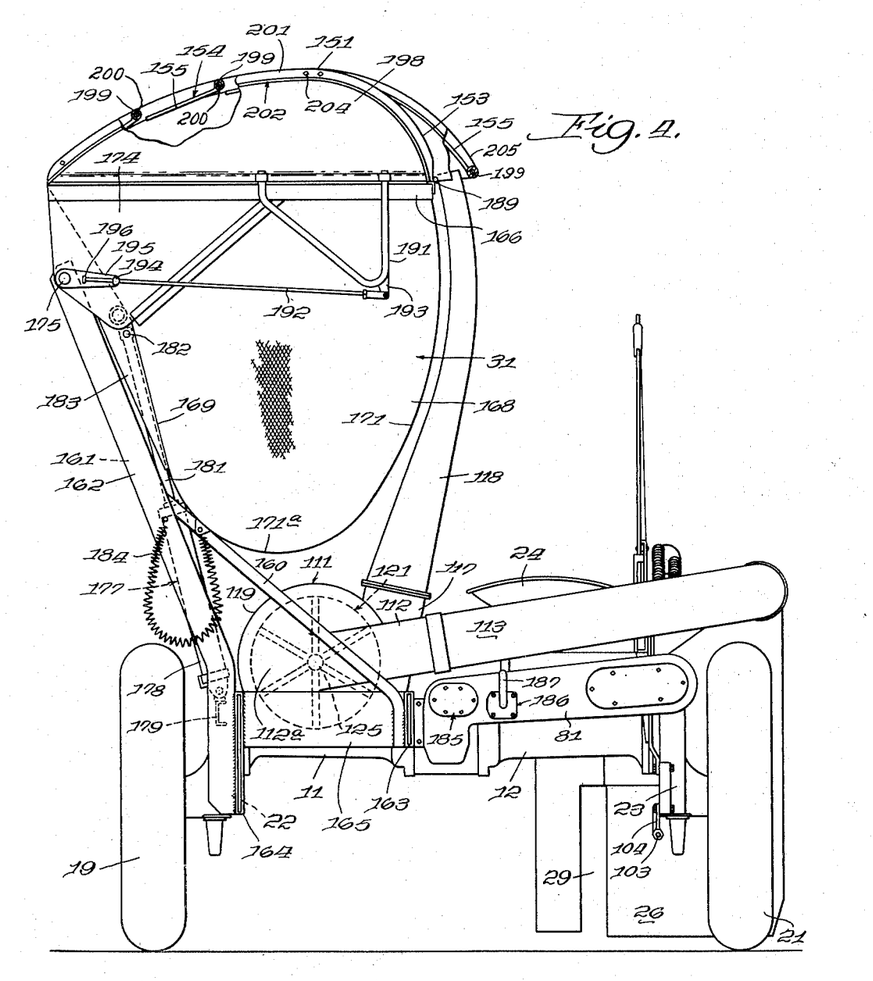
Fig. 4 is a rear elevational view of the tractor (with parts omitted for clarity) and apparatus, with the receptacle in the filling position.

Support for the crop gathering or picking unit 26 is provided by a crop gathering unit supporting means carried on the tractor over a space forwardly of one axle housing and at one side of the tractor body. This supporting means includes a frame 55 comprising a generally L-shaped frame member 56 having a fore and aft extending leg 57 and a laterally turned leg 58 having a juncture 59. A strut member 61 connects with the frame member 55 adjacently to the juncture 59 where the member 61 extends through an aperture (not shown) in the leg 57 of the frame member 56. A welded connection 62 is provided between the members 61 and 56. The rear part of the leg 57 is supported upon the tractor axle housing 12 by a plate 63 (Figures 1 and 2) to which the member 57 is secured by any standard means 63' in Fig. 1. The bifurcated lower edge of the plate 63 straddles the outer end of the axle housing 12 and is secured to the depending gear housing 23 as shown in Figures 1 and 4. A footing plate 64 is welded or otherwise secured to the free ends of the members 58 and 61, and this plate 64 is adapted to be secured to the tractor body 10 by means of cap screws 65 which are screwed into bosses or pads 66 and 67 provided upon said body 10.

Means for suspending the picking unit from the frame 55 includes the outer end of the strut 61 which passes through the frame leg 57 extends into and provides a bearing spindle for the hub 68 of a bell-crank 69, which has a pair of laterally spaced horizontal arms 71 and 72 and an upright arm 73. The forward ends of the arms 71 and 72 mutually support the upper end of a linkage 74 which is rigidly attached to the picking unit by cap-screws 74'. By pivoting the bell-crank 69, the outer end of the arms 71 and 72 can be raised or lowered for changing the elevation of the picking unit which is suspended therefrom through the link 74. Pivoting of the bell-crank 69 is effected manually through a lever 75 having its lower end attached to the hub of the bell-crank and operable over a quadrant 70, Fig. 2, for retaining a selected height of the picking unit. The upwardly projecting arm of the bell-crank is operated upon by the counter-balancing spring assembly 76, which is adjustably connected to a bracket 77 on the back end of the frame leg 57 by a threaded rod 78 and a nut 79. Since the counter-balancing spring 76 is connected to the frame 55 through the bracket 77 and the bell-crank 69, which may be retained in a selected pivoted relation by the engagement of the lever 75 with the quadrant 70 irrespective of whether the picking unit 26 is supported upon the forwardly projecting arms of the bell-crank, said counter-balancing spring can be assembled and disassembled from the tractor with the frame while the forwardly projecting arms of the bell-crank remain in a lowered or horizontal position which facilitates attachment and detachment of the picking unit.

*Picker unit driving means*

Figures 9, 10:
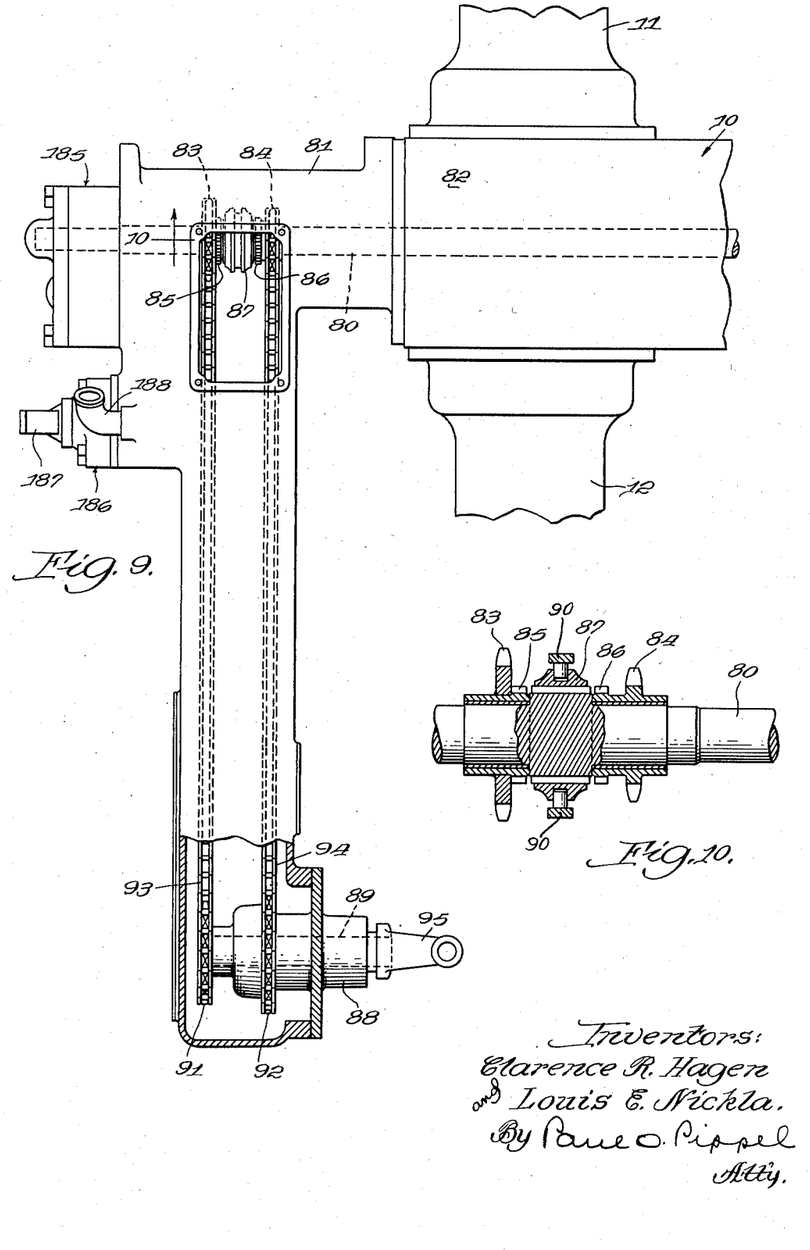
Fig. 9 is a fragmentary plan view of the rear end of the tractor, showing the differential housing and adjacent parts of the rear axle housing together with a casing which encloses selectable driving chains for transmitting driving force to the cotton-picking unit.
Fig. 10 is a view taken on the line 10 of Fig. 9 illustrating a clutch utilizable for selecting which of the chains illustrated in Fig. 9 shall be employed for transmitting the driving force to the picking unit.

Driving force for the cotton-picking unit 26 is obtained from a power take-off shaft 80 which is rotated by any standard means (not shown) from the vehicle engine. The back end of the shaft 80 projects into a casing 81 attached to the back end of a differential housing 82 disposed between the axle housings 11 and 12; see Fig. 9. Two chain sprockets 83 and 84 are journaled upon that portion of the power take-off shaft in the casing 81, and these chain sprockets have jaw clutch counterparts 85 and 86 rotatively fixed thereto. A clutch spool 87 disposed between the clutch counterparts 85 and 86 is splined to the shaft 80. The rear end portion of the spool 87 constitutes a clutch counterpart meshable with the counterpart 85, whereas the front end portion of the spool constitutes a clutch counterpart meshable with the counterpart 86. The details of this construction are shown in Fig. 10. Shifting of the spool is effected by a shifter fork of conventional construction having bifurcation portions 90 projecting into the circumferential groove of the spool. When the spool 87 is shifted rearwardly, the sprocket 83 will be clutched for rotation to the power take-off shaft 80, and when the spool 87 is shifted forwardly, the sprocket 84 will be clutched to said shaft. The spool 87 is shown in a neutral position in which neither of the sprockets is connected with said shaft. The housing 81 extends transversely of the tractor outwardly along the backside of the rear axle housing 12, and the outer part of the housing carries a bearing 88 for a shaft 89. This shaft has sprockets 91 and 92 thereon which are respectively connected with the sprockets 83 and 84 by chains 93 and 94. The drive to the picker unit is completed through a universal joint 95 at the forward end of the shaft 89, a forwardly projecting shaft 96, a universal joint 97 at the front of this shaft, and thence through suitable gearing (not shown) within a gear casing 98 supported upon the picking unit 26. The gearing in the casing 98 and the power connection between this gearing and the spindles within the casing 26 are immaterial to this invention.

Fore and aft pendulous movement of the picking unit 26 about its support on the arms 71 and 72 is prevented by a brace rod 101 pivotally connected at 102 to a rear portion of the picking unit and pivotally connected at its rear end to a threaded rod 103 adjustable within a bracket 104 connected to the depending axle housing portion 23. The fore and aft position of the rod 103 is determinable by nuts 105 and 106 upon either side of that part of the bracket 104 receiving the stem 103. In addition to lending stability to the picking unit, the brace rod 101 can also determine the elevation of the front end of the picking unit by holding the unit in a selected pivoted relation about its support at the front ends of the bell-crank arms 71 and 72. Sometimes it is desired to so support the picking unit that its front end will be slightly higher in elevation than its rear end so the bottom of the unit can engage and skid over small hummocks and the like upon the earth surface.

Pneumatic cotton-conveying system

Figures 5, 6, 7, 8:
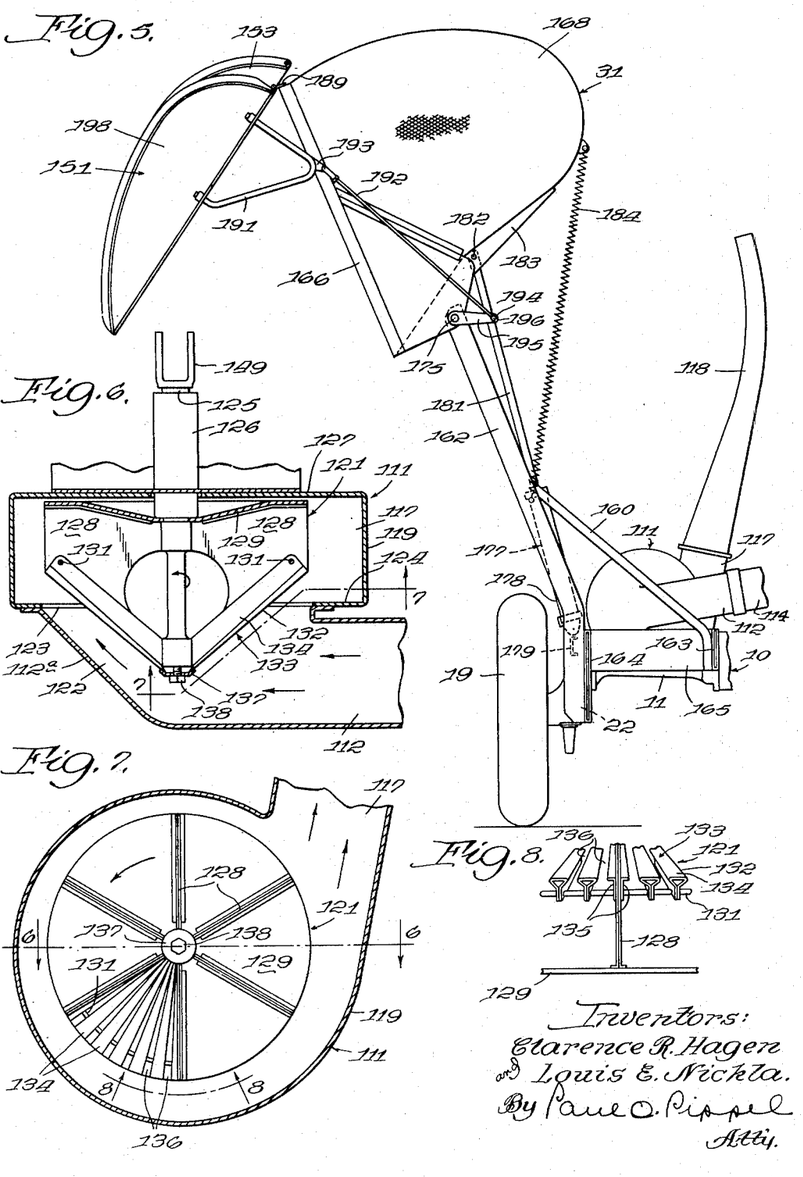
Fig. 5 is a fragmentary rear elevational view corresponding to Fig. 4 but illustrating the receptacle in the dumping position.
Fig. 6 is a horizontal sectional view taken through the blower at the plane indicated by the line 6 in Fig. 7.
Fig. 7 is a vertical sectional view taken through the blower on the line indicated by the line 7—7 in Fig. 6.
Fig. 8 is a fragmentary view illustrating a peripheral edge of the blower rotor and a radially slotted guard therefor, taken on the line 8—8 of Fig. 7.

A blower 111 supported at the left rear part of the tractor beneath the receptacle 31 constitutes an element of crop conveying means for conveying the cotton from the picking unit 26 into said receptacle. This blower, of which the details are shown in Figs. 6, 7, and 8, has a horizontal inlet 112 which sucks air and cotton from the picking unit 26 through the conduit legs 32 and 33, Fig. 1, thence through a conduit 113 with which these legs 32 and 33 are confluent, and thence through a curved conduit 114. Conduit 113 extends rearwardly and upwardly over the right rear wheel of the tractor as well as over the rear axle housing structure 12, and the conduit 114 then connecting with the conduit 113 at a flexible joint 115 extends transversely across the rear of the tractor to the horizontal fan inlet 112. The conduit 113 also has a flexible joint 116 which cooperates with the joint 115 in articulating the conduit system so that it facilitates vertical adjustment or movement of the picking unit.

The fan outlet 117, Figs. 4 and 7, extends vertically for connection with an upwardly extending spout 118 through which the air and cotton are discharged into the upper part of the receptacle 31.

Referring now more particularly to Figs. 6, 7, and 8, the casing for the blower can be seen to comprise a generally cylindrical wall 119 circumferentially about and radially spaced from a bladed rotor 121. A vestibule 122 of the blower is disposed between that part of the casing surrounded by the cylindrical wall 119 and the inlet 112. A circular opening 123 in the rear end wall 124 of the main part of the casing within the cylindrical wall 119 provides communication between the vestibule and the main part of the casing.

The rotor 121 is fixed for rotation with a shaft 125 rotatable within a bearing 126 carried within the front wall 127 of the casing. This rotor comprises six impeller blades 128 secured to and extending radially from the shaft 125. These blades are secured at their front edges to an end plate 129 which assists in maintaining them in their equal angular radiating relation. A circular wire rod 131 passes through rearward portions of the blades near their outer ends, and this member assists the plate 129 in maintaining the blades in the desired formation. The circular rod 131 also provides a support for radiating elements 132 of a fan guard assembly 133. Said elements 132 are folded into shape from elongated strips of sheet metal, elongated center sections of the strips forming spaced segments 134 of the conical guard assembly, while opposite edge portions of the strips from which these members 132 are formed are carried together and are perforated for receiving the rod 131; see Fig. 8. Each of the blades 128 is supplied with a pair of channel members 135 with the shorter legs of these channel members turned in opposite directions, as illustrated in Fig. 8, to complementally form a surface corresponding to the segmental surfaces 134 of the elements 132. The entire assembly is conical with the radiating slots 136 between the radial elements 132. The elements 132 are held against an enlarged rear end portion of the shaft 125 by a cap 137, Fig. 6, and a cap screw 138 turned into the back end of said shaft.

In the operation of the blower, the rotating rotor discharges air centrifugally against the cylindrical wall 119, the rotation of the fan being counter-clockwise as viewed from the rear in Fig. 7 so that this discharged air is impelled tangentially upwardly from the casing through the vertical outlet 117. The air thus discharged from the space between the fan blades 128 is replaced by air forced by the atmosphere inwardly through the cotton-picker unit casing 27, where the spindles project into the passage 29. The casing 27 therefore serves as an air chamber, and the cotton picked by the spindles and carried into this chamber where it is doffed by the doffing mechanism D is carried upwardly by the air conduit legs 32 and 33. The air thus forced into the casing and air chamber 27 of the picking unit, laden with the picked cotton, after passing up into the legs 32 and 33 passes backwardly into the conduit 113 and thence through the conduit 114 into the blower inlet. Inlet 112 is arranged transversely of the axis of the rotor 121 whereby the inertia of the cotton has a tendency to cause this cotton to impinge against a deflector wall 112ª and thence to move radially of the rotor and conical guard, through the opening 123 in the rear wall of the main part of the casing, and thence onto the cylindrical wall 119 without engaging or being struck by the fan blades and without striking the guard member or assembly other than with a glancing impact. There can be no striking of the seed cotton being picked by the fan blades 128, since the radial slots 136 in the guard assembly are too narrow for permitting cotton to enter these slots although the air entering the blower does pass through these slots into the space between the fan blades from where it is centrifugally ejected.

It is important that the seeds in the picked cotton shall not be broken or cracked by the fan blades. The seeds which are only partly broken by being cracked will lose some of their oil which discolors the cotton and thereby lowers its grade and selling price. Cracked seeds because of this loss of oil are also less valuable to cotton-seed processing mills since their yield of oil will be less. By employing the guard assembly 133, as herein illustrated, and by introducing the seed cotton into the vestibule 122 of the fan casing transversely of the rotor axis and angularly to encountered surfaces of said guard assembly, the cotton seeds are handled sufficiently gently to avoid breakage.

It has been found that by making the conical guard member or assembly 133 with the radiating slots 136, the guard member will avoid accumulating cotton fibers and lint. It can be observed in Fig. 7 that the radiating slots 136 increase in width from the center to the outer perimeter of the guard member which is a factor further increasing the difficulty with which fiber or lint particles could cling to the sides of the radiating slots 136. There must be no accumulation of foreign particles within the slots of the guard member for, if these slotted openings were closed, the fan or blower would become ineffective or its efficiency very materially reduced.

The placing of the fan or blower 111 immediately below the cotton receptacle 31 decreases the distance which the cotton must be moved from the blower into the receptacle and thereby makes it possible for the cotton and air to be discharged with greater speed through the remaining portion of the conduit system leading to the receptacle. This has a significance which will presently be described. Placing the fan or blower 111 below the receptacle has a further advantage of utilizing the fan for changing the direction of flow of the cotton-laden air. Since it is a property of a blower to change the direction of the air propelled thereby, the expedient is here used of taking strategic advantage of the change in flow direction incurred by the blower, so that no unnecessary loss in efficiency will be necessary in directing the air and cotton to the desired place. Thus the blower constitutes a means for changing the direction of the course of cotton in the conduit 113 leading across the rear of the tractor to the horizontally directed inlet 112 and directing this cotton upwardly through the vertically directed outlet 117 and the spout 118 into the receptacle.

Figures 2, 3:
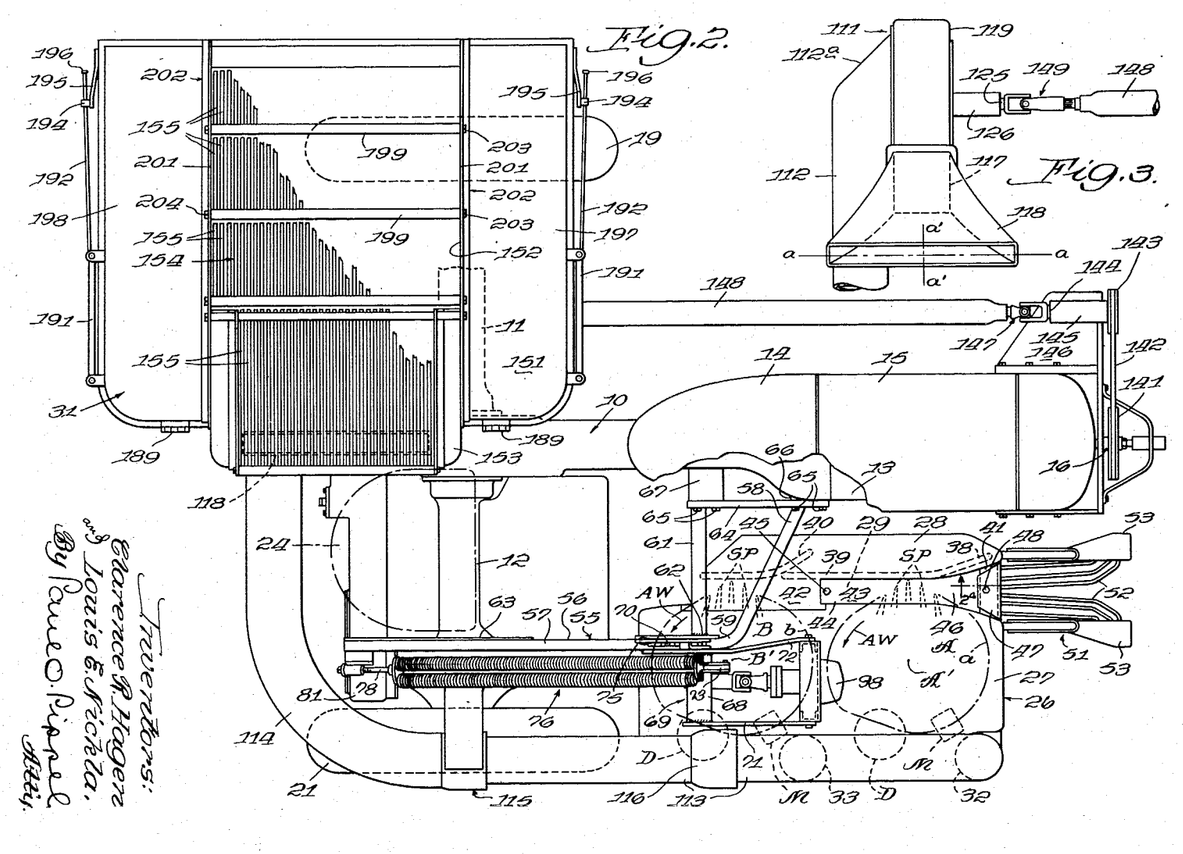
Fig. 3 is a plan view of a cotton conveying blower employed in the apparatus and installed below the cotton receptacle as illustrated in Figs. 1, 4, and 5.

A further advantage of placing the blower beneath the receptacle 31 and particularly at the rear left side of the tractor is that the axis about which the blower rotor rotates extends forwardly alongside the left side of the tractor body and engine. This disposition of the blower rotor axis makes it possible to construct a simple driving connection therefor extending from the front end of the tractor engine crank-shaft. This driving connection consists of a pulley 141, Fig 2, fixed rotatively to the front end extension 16 of the engine crankshaft, a belt 142 drivingly connecting the pulley 141 with a pulley 143 upon the front end of a shaft 144 journaled within a bearing 145 supported upon a bracket 146 suitably attached to the tractor engine. A universal joint 147 connects the back end of the shaft 144 with a long shaft 148, of which the back end is connected directly with the blower rotor shaft 125 through a universal joint 149; see Fig. 3. It is essential, to prevent choking of the pneumatic system with cotton, that the blower be operating at the very instant the picking of cotton commences. With the present arrangement for driving the blower at all times while the tractor engine is running, assurance is had that air will be forced from the plant passage 29 in the picking unit 26 into the air chamber or casing 27 at the time of the passage of plants into the passage 29 and the operation thereon by the spindles SP. Introduction of cotton into the chamber 27 without the attendant introduction of air and the consequent choking of the pneumatic system is thereby definitely avoided.

In Fig. 2, the roof of the hopper 31 can be seen to comprise a vaulted cover member 151 having an opening 152 extending thereacross from its inner edge to its outer edge. The roof or cover member 151 also comprises a hood 153 projecting over the upper inner edge of the receptacle. The opening 152 is covered by a grille 154 which consists of a series of grate units each having a series of laterally spaced elements 155 extending lengthwise across the opening from its inner side to its outer side. One of these grate elements is formed in the hood 153 and therefore has curved elements 155. It is the purpose of the grille 154 to dissipate the air which is discharged upwardly through the spout 118 together with debris, such as sticks, twigs, stems and the like, drawn into the pneumatic system from the plants within the passage 29 in the picking unit, while at the same time retaining the cotton within the receptacle. To better enable the grille 154 to separate the debris from the seed cotton, it is desirable that this grille shall be made wide so that the cotton can be spread over the grille in a thin sheet and thereby decrease the thickness of this sheet through which the debris must be passed prior to reaching the grille for ejection therethrough. Forming the cotton-laden air stream into a thin layer for introduction onto the under side of the grid 154 is accomplished by the spout 118. This spout, as viewed in Figs. 1, 2, 3, and 4, has substantially a square horizontal section at its bottom end, and as it rises it decreases in thickness laterally of the receptacle side wall along which it extends and increases in width lengthwise of the receptacle side wall until the upper end of the spout has a major axis $a—a$ running parallel to the adjacent upper edge of the receptacle and a short minor axis $a'—a'$ normal to the adjacent receptacle edge. In Fig. 2, where the upper end of the spout 118 is shown in dotted lines, it can be seen that the cotton discharged from this upper end of the spout will issue in a thin layer against the under side of the grille and thereby improve the opportunity for foreign particles to be separated from the cotton and conducted outwardly between the grille elements 155 by the air stream.

*Cotton receptacle*

The receptacle 31 is supported upon a frame structure which comprises a standard consisting of a pair of fore and aft spaced, generally upright channel members 161 and 162. A base portion of the frame structure for supporting the standard comprises a pair of backwardly extending plates 163 and 164, Figs. 1 and 4, attached to the rear axle housing 11. The frame member 164 has a vertical dimension considerably in excess of the plate or member 163 and is attached to a depending axle housing portion 22 as well as to the horizontal axle housing 11. The back ends of the plate-like members 163 and 164 are connected by a cross-plate 165. The member 165 is welded to the members 163 and 164. There is also a welded connection between the vertical and lower end portions of the standards 161 and 162 and the outer side of the base frame member 164. Brace members 160, of which one is shown in Fig. 4, respectively connect mid-sections of the standard members 161 and 162 with the base member 163 through welded connections therewith. The standard structure, consisting of the uprights 161 and 162 and the base therefor consisting of the parts 163, 164, and 165, is unitarily mounted on the left rear axle housing of the tractor.

The basket part of the receptacle 31 comprises a rectangular frame 166 extending about its upper edge. From the front and rear ends of this frame 166 there depend front and back walls 167 and 168 of open mesh sheet material, which in the present instance is woven from steel wire. These walls 167 and 168 are curved toward one another at their lower edge and at their opposite upwardly extending edges, as illustrated in Figs. 1, 2, and 4. The outer and inner walls 169 and 171 of the basket part of the receptacle are connected with the cupped edges of the end walls at U-shaped reinforcing connecting bands 172 and 173 of steel, and which bands depend from the rectangular frame member 166 bounding the upper edge or brim of the basket. These outer and inner walls 169 and 171 and the intermediate bottom wall portion 171a are formed with a sectional contour transversely of the tractor that is somewhat parabolic in form. The piece of smooth solid metal sheeting forms the wall 169 while the bottom wall 171a and the inner wall 171 are formed of wire mesh similarly to the end walls 167 and 168.

Opposite end plates 174 (of which one is shown in Fig. 4) are rigidly secured to and depend from the frame member 166 at the upper outer portions of the basket, and these end plates are journaled upon opposite ends of a rod 175 carried in the standard uprights 161 and 162. This pivotal connection between the basket and the upper ends of the standard members 161 and 162 normally supports the basket in the position illustrated in Fig. 4 on the inner side of the standard and over the supporting base for such standard, with a bottom portion of such receptacle resting upon the footing braces 160 for said standard members, while permitting the basket to be pivoted counter-clockwise from the Fig. 4 position to a dumping position illustrated in Fig. 5.

Dumping of the receptacle is brought about by a hydraulic ram or motor 177 comprising a cylinder 178 having its lower end pivotally connected to a channel cross-piece 179 anchored to the lower ends of the standard uprights 161 and 162 and a piston rod 181 pivotally connected with the outer wall of the receptacle by means of a pin 182 anchored within a pair of fore and aft reenforcing plates 183, which are secured to the outer wall of the basket. When fluid is introduced into the lower end of the cylinder 178, a piston therein (not shown) will be forced upwardly and thereby will force the piston rod 181 upwardly for pivoting the basket into the dumping position. Normally relaxed helical springs 184 (one being shown in Figs. 4 and 5) respectively connected between the standards 161 and 162 and the basket, become distended when the receptacle approaches a poised position and continue to be distended when the basket reaches the over-center dumping position illustrated in Fig. 5, whereby these springs cause the receptacle to pivot clockwise from the Fig. 5 dumping position toward the filling position of Fig. 4 when fluid is allowed to escape from the lower end of the motor cylinder 178. These springs continue to act upon the receptacle after it has passed the over-center position when returning to the filling position so as to accelerate the return of the basket and thereby minimize the time required for dumping.

Fluid for operating the dumping motor 177 is obtained from a gear pump comprising a casing 185, Figs. 4 and 9, secured onto the back end of the housing 81 and driven by the back end of the shaft 80 extending through the differential housing 82 of the tractor. Oil is pumped by the pump 185 from the bottom of the casing 81 which also serves as a reservoir. This oil as it is discharged from the pump is controlled by a valve 186 having a manually operable control lever 187. When the lever 187 is in the upright position illustrated in Figs. 4 and 9, the pump discharge is directed through the valve 186 back to the reservoir or sump in the casing 81. When the control lever 187 is pivoted counter-clockwise, as viewed from the rear, the output of oil from the pump 185 is directed into the lower end of the motor 178 through an outlet coupling 188 and a hose (not shown). After the receptacle has been raised, the lever 187 will be moved clockwise back to its upright position where the valve will permit the pump 185 to by-pass but will prevent exhaust of fluid from the motor so that the receptacle can be retained in the dumping position as long as desired. Return of the receptacle to the filling position is initiated by movement of the lever 187 clockwise, as viewed in Fig. 4, to a position beyond the upright position there illustrated. This allows the motor to drain, and after the receptacle has reached the filling position, the lever 187 will be returned to the neutral position of Fig. 4.

A linkage is provided for causing the cover 151 of the receptacle to pivot about hinges 189 connecting the inner edge of this cover member with the basket brim, when the receptacle is pivoted to the dumping position. When so pivoted, the cover member is opened with respect to the basket so that the cotton is readily dumpable from the basket into a wagon box, or the like, which may be driven up alongside of the machine. The linkage for opening the cover 151 includes double-legged brackets 191 secured to opposite ends of the cover member and links 192 respectively pivotally attached to ears 193 on these brackets 191 and having a sliding connection with respective pins 194 pivotally anchored in arms 195 which are fixed to opposite ends of the non-rotatable rod 175. These links 192 have heads 196 on their outer ends for abutment with the pivotal pins 194, as illustrated in Fig. 5, prior to the receptacle reaching the dumping position. Continued counter-clockwise movement of the receptacle, as viewed in Fig. 5, shortly prior to reaching the dumping position and after the links 192 can move no farther upwardly, will cause the links to pull downwardly on the ears 193 and the brackets 191 for causing the cover member to pivot about the pivot pins of its hinges 189 into the opened position. When the receptacle is returned toward the filling position, the links 192 will slide downwardly into the holes therefor in the pins 194, permitting the cover to close upon the top of the receptacle by the force of gravity.

The cover 151 for the basket part of the receptacle 31 is arched between its inner edge (disposed adjacently to the upper end of the spout 118) and its outer or opposite edge and is constructed of debris-impervious sheets 197 and 198 upon opposite sides of the opening 152 formed between these sheets. An arched grille 154 covers this opening, said grille being composed of a plurality of units 159—199 each consisting of a transverse member 199 having transversely spaced longitudinal elements 155 extending therefrom. The elements 155 extend from each of their associated transverse members 199 toward the outer wall of the receptacle, the wall disposed at the left side of the receptacle in Fig. 4, the free ends of each group of elements 155 extending adjacently to and slightly beneath the transverse element 199 of the unit next adjacent thereto in a direction toward the outer wall of the receptacle. Each of the transverse members 199 is hollow to enable it to receive a rod 200 which extends through upright flanges 201 of angle pieces 202 extending along the opposite edges of the opening 152. One end of the rods extending through the transverse members 199 has a faceted head 203, and the opposite end of each rod is threaded to receive a nut 204.

The rightmost grid unit 155—199 in Fig. 4 has its transverse member 199 disposed at the lower end of a hooded portion of the grille which projects outwardly from the inner edge of the basket, and the spaced grid elements 155 projecting from this particular transverse member are curved as illustrated in Figs. 4 and 5. This hooded portion of the grille thus provides a downwardly facing inlet opening for the receptacle 31, such inlet opening being on the side of the receptacle disposed inwardly of the tractor (the right side as viewed in Fig. 4) and being communicative with the upper end of the spout 118, Fig. 4.

Cotton-laden air entering the hooded portion of the grille 154 first strikes the curved elements 155 of the grid element unit over the top of the hood. It is at this point that most of the trash is separated from the cotton along with part of the air from the conveying air stream. This part of the air and trash is carried outwardly from the receptacle between the grille elements 155, while the cotton is deflected across the top of the receptacle along the under surfaces of the grille units. During this traversal by the thin layer of cotton across the upper side of the receptacle, part of the air continues to be dissipated through the grille and to carry pieces of foreign material therewith. Particularly because of the momentum of the cotton and because of the air movement across the top of the receptacle, the cotton is caused to be carried to a position adjacently to the upper edge of the outer receptacle wall. This cotton then drops into the lower part of the receptacle but first fills the receptacle within the bottom and along the outer wall, and as the filling process continues, the surface of repose of the cotton will gradually approach the inner upper part of the receptacle, which part is the last to be filled, whereby the receptacle becomes completely filled without attention of the operator.

There are several factors which improve the dumping ability of the receptacle. One of these features is the arrangement of the longitudinal grille elements 155 so that their free ends are projected away from the hinged edge of the cover member 151 so that any cotton falling from the receptacle against the under side of the grille during the dumping operation will have no tendency to cling to the grille. In other words, the top or cover member of the receptacle itself dumps any cotton that may be therein due to the receptacle being filled to an extent that the cotton is heaped therein or falls against the under side of the grille when the receptacle is dumped.

Another feature that facilitates dumping is the parabolic transverse section through the inner and outer walls and the bottom wall. Because of this curved contour of these walls of the receptacle, the cotton which first falls away from the upper part of the inner wall as the dumping of the cotton actually commences, tends to pull other cotton with it so that there is a progressive rolling away of the cotton from the inner wall (upper when the receptacle is in the dumping position) toward the bottom of said wall and the bottom of the receptacle.

Another feature which improves the dumping characteristics of the receptacle is the use of a smooth sheet in forming the receptacle outer wall 169. Any cotton resting upon this sheet will more readily slide from the receptacle while the latter is in the dumping position. The receptacle is made as light in weight as possible, however, by employing the mesh-woven wire side walls for the most part.

While the center part of the cover member is formed with an opening covered by the grille 154, the ends 197 and 198 of the cover member at the sides of the opening are made of material such as sheet metal through which the dust and dirt and small stems discharged with the air blast through the grille cannot pass through for return back into the receptacle subsequent to discharge through the grille. During operation of the machine, these particles of debris can be seen to gravitate toward the edges of the dome-shaped cover member and to fall away in the atmosphere where they are sometimes swept away by wind. In earlier machines where the top of the receptacle was made perfectly flat, there was such an accumulation of foreign particles upon the top about the air-blast discharge opening that before dumping the cotton it was necessary for the operator to employ a broom for sweeping these particles away from the top so they would not be dumped with the cotton into the vehicle for conveying the cotton from the field.

Having thus disclosed a preferred embodiment of the invention, we claim:

1. In cotton harvesting apparatus for use upon a tractor including a narrow body projecting forwardly from laterally projecting rear axle housings and including a cotton picker unit for disposition forwardly of one of such housings adjacently to a side of the tractor body; a picker unit supporting structure comprising a generally L-shaped frame member having a transverse leg and a fore and aft leg for attachment of free end portions thereof respectively to said side of the tractor body at a position forwardly of said axle housing and to said axle housing outwardly from said body, a strut member secured to the frame member adjacently to the junction of its legs and presenting an end portion for connection with the tractor body, a bell-crank lever having upright and horizontal legs pivotally supported by said frame member, the horizontal leg being for the support of the picker unit, a picker unit counterbalance spring connected between the upright bell-crank leg and a rear portion of the fore and aft frame leg, and means on said supporting structure for pivoting the bell-crank and maintaining its pivoted position to determine the elevation of the picker unit.

2. In cotton harvesting apparatus for use upon a tractor including a narrow body projecting forwardly from laterally projecting rear axle housings and including a cotton picker unit for disposition forwardly of one of such housings adjacently to a side of the tractor body; a picker unit supporting structure comprising a generally L-shaped frame member having a transverse leg and a fore and aft leg, a strut member secured to the frame member adjacently to the junction of its legs and projecting in the same general direction as the transverse leg with reference to the fore and aft leg, a footing plate secured to the free ends of said strut and of said transverse leg, said footing plate being for attachment to said side of the tractor body forwardly of said axle housing and a free end portion of the fore and aft frame leg being for attachment to said axle housing at a portion spaced outwardly from the tractor body, a lever having a horizontal leg pivotally supported by the frame member, said lever being for the support of the picker unit to change its elevation when pivoted, and means on said structure for adjusting the pivoted position of said lever.

3. In a cotton picking apparatus, a tractor having a narrow body with an engine-driven power-take-off shaft at its front and traction wheel axles extending laterally oppositely at its rear, a cotton receptacle disposed in an elevated position substantially over one of said axles, and a pneumatic cotton transferring system comprising a cotton propelling blower mounted on the tractor beneath said receptacle, said blower including a rotor casing having inlet and discharge passages of which the former leads horizontally into the casing and the latter is directed upwardly, and a rotor in said casing rotatable about an axis arranged fore and aft of the tractor to induce air and cotton into said casing through the inlet passage and to discharge the same through said outlet passage, a drive shaft drivingly connected with the rotor and projecting coaxially thereof and forwardly therefrom alongside of the tractor body, drive means for said shaft extending transversely of the tractor between a forward part of said shaft and said power-take-off shaft, and a discharge conduit directed upwardly from the blower discharge passage into position for directing the cotton therefrom into an upper part of said receptacle.

4. In a cotton picking apparatus; a tractor having a narrow body with an engine-driven power-take-off shaft at its front and traction wheel axles extending laterally oppositely at its rear; a cotton picking unit; means for attaching said unit to the tractor body adjacently to a side thereof and forwardly of the axle at such side; a cotton receptacle; means for mounting said receptacle upon the tractor in an elevated position at the other side adjacently to the other axle; and a pneumatic cotton transferring system which includes an air and cotton conveying conduit extending communicatively from the picking unit rearwardly over the axle at the one side of the tractor and laterally of the tractor rearwardly of said axles; and means for changing the course of the cotton as it discharges from the laterally extending portion of said conduit upwardly into the receptacle, comprising a blower disposed rearwardly of said other axle, said blower having a horizontal inlet disposed in communication with said conduit portion and an upwardly extending outlet and including a rotor rotatable about an axis arranged fore and aft of the tractor to induce air and cotton from said conduit into said inlet and to discharge such air and cotton through the outlet, a discharge conduit projecting upwardly from the blower outlet into position for discharging into an upper part of the receptacle, and means for driving the blower rotor including a rotor drive shaft connected with the rotor and projecting forwardly therefrom along the other side of the tractor body, and drive means for said shaft extending transversely of the tractor between a forward part of said shaft and said power take-off shaft.

5. In a cotton picking apparatus; a tractor having a narrow body with engine-driven traction wheel axles extending laterally oppositely at its rear; a cotton picking unit; means for attaching said unit to the tractor body adjacently to a side thereof and forwardly of the axle at such side; a cotton receptacle; means for mounting said receptacle upon the tractor in an elevated position rearwardly of said axles; and a pneumatic cotton transferring system which includes an air and cotton conveying conduit extending communicatively from the picking unit rearwardly over the axle at the one side of the tractor and having a portion extending laterally of the tractor rearwardly of said axles; and means for changing the course of the cotton upwardly into the receptacle as it discharges from said laterally extending portion of the conduit, comprising a blower disposed rearwardly of said axles, said blower having a horizontal inlet communicative with said conduit portion and an upwardly extending outlet, a discharge conduit projecting upwardly from said blower outlet into position for discharging into an upper part of the receptacle, and means for driving the blower from the tractor engine.

CLARENCE R. HAGEN.
LOUIS E. NICKLA.

REFERENCES CITED

The following references are of record in the file of this patent:

UNITED STATES PATENTS

| Number | Name | Date |
|---|---|---|
| 194,854 | Van Dorn | Sept. 4, 1877 |
| 608,689 | Lee | Aug. 9, 1898 |
| 671,402 | Schuman | Apr. 2, 1901 |
| 830,443 | Le Vin | Sept. 4, 1906 |
| 891,191 | Shinn | June 16, 1908 |
| 1,123,620 | Straus | Jan. 5, 1915 |
| 1,887,831 | Willett | Nov. 5, 1932 |
| 1,894,198 | Rust et al. | Jan. 10, 1933 |
| 2,023,491 | Rust et al. | Dec. 10, 1935 |
| 2,058,514 | Rust et al. | Oct. 27, 1936 |
| 2,082,053 | Freudenberg | June 1, 1937 |
| 2,214,818 | Johnston | Sept. 17, 1940 |
| 2,234,599 | Johnston | Mar. 11, 1941 |
| 2,352,291 | Scarratt et al. | June 27, 1944 |
| 2,399,718 | Baker et al. | May 7, 1946 |